United States Patent [19]

Leone et al.

[11] Patent Number: 5,596,346
[45] Date of Patent: Jan. 21, 1997

[54] METHOD AND APPARATUS FOR APPLYING A FUNCTION TO A LOCALIZED AREA OF A DIGITAL IMAGE USING A WINDOW

[75] Inventors: Anthony J. Leone, Pittsford; Jeffrey R. Szczepanski, Rochester; Steven M. Smith, Fairport, all of N.Y.

[73] Assignee: Eastman Kodak Company, Rochester, N.Y.

[21] Appl. No.: 597,687

[22] Filed: Feb. 6, 1996

Related U.S. Application Data

[63] Continuation of Ser. No. 278,790, Jul. 22, 1994, abandoned.

[51] Int. Cl.$^6$ .................................................. G09G 5/00
[52] U.S. Cl. ......................... 345/127; 345/121; 345/173; 358/538; 358/453
[58] Field of Search ...................................... 358/451–453, 358/531, 537, 538; 345/118, 121, 127, 130, 131, 145, 173; 364/413.14; 395/139

[56] References Cited

U.S. PATENT DOCUMENTS

| | | | |
|---|---|---|---|
| 4,982,345 | 1/1991 | Callahan | 345/118 |
| 5,283,562 | 2/1994 | Kaneko | 345/145 |
| 5,331,335 | 7/1994 | Iida | 345/121 |
| 5,341,466 | 8/1994 | Perlin et al. | 395/139 |
| 5,398,684 | 3/1995 | Hardy | 364/413.14 |

OTHER PUBLICATIONS

Robert Cowart, "Mastering Windows 3.1", 1992, pp. 386–387.

*Primary Examiner*—Steven Saras
*Assistant Examiner*—Kent Chang
*Attorney, Agent, or Firm*—J. Randall Beckers

[57] ABSTRACT

A system that allows a user to apply image processing functions to localized regions of a photographic or negative image supplied by a photographer. The image is displayed on a touch sensitive display and the user can, by touching the display, maneuver a window to pan, zoom-in and zoom-out on particular portions of the image to designate a region to be processed. The operator can precisely indicate where the artifact to be removed is located and will know precisely the area of the image that will be processed. Only the portion of image seen by the user in the window is processed when the user indicates a function should be applied to the image. That is, what the user sees is what is processed. The processed image can be printed or otherwise reproduced.

4 Claims, 4 Drawing Sheets

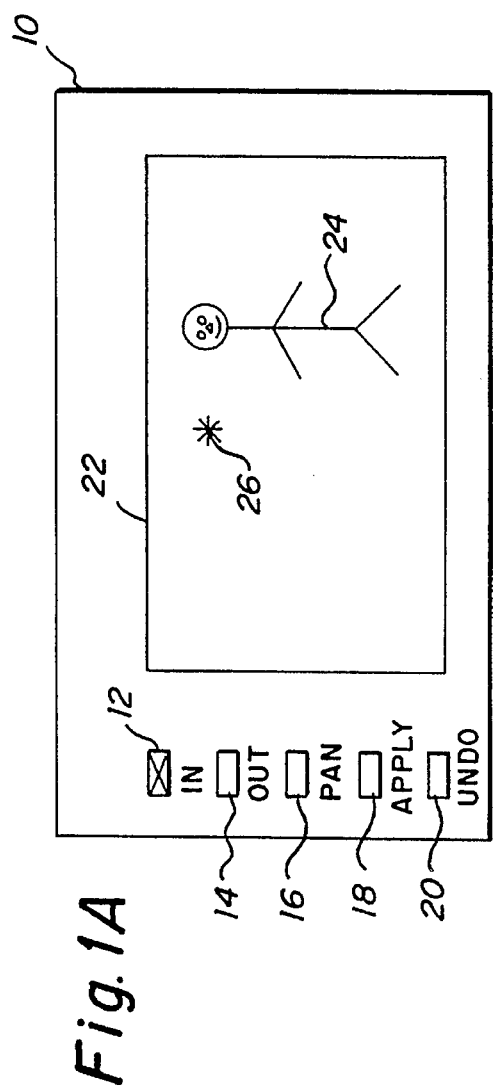
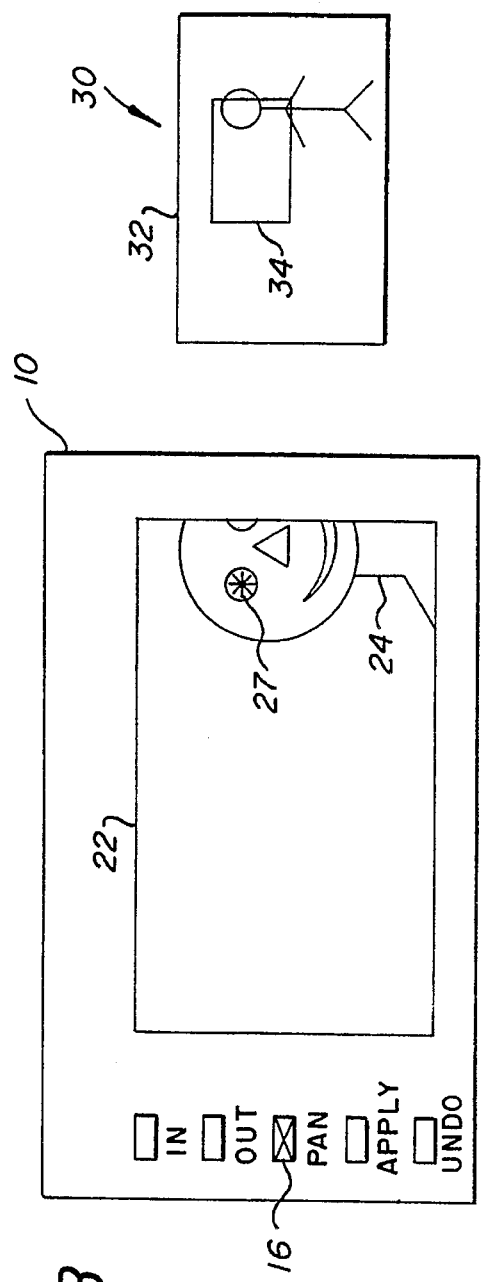

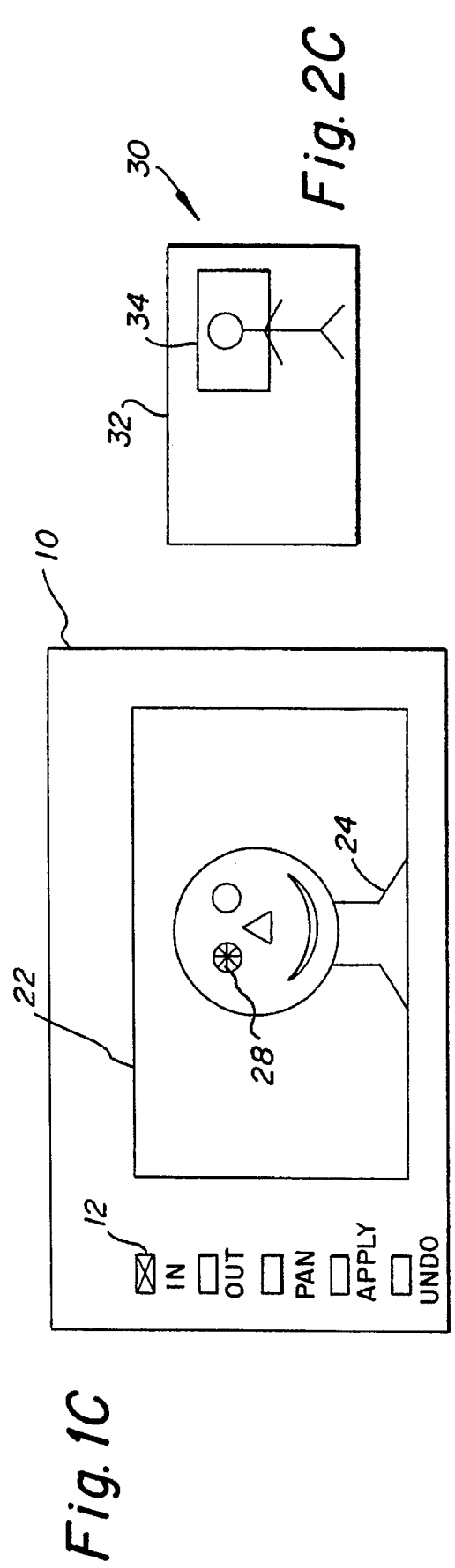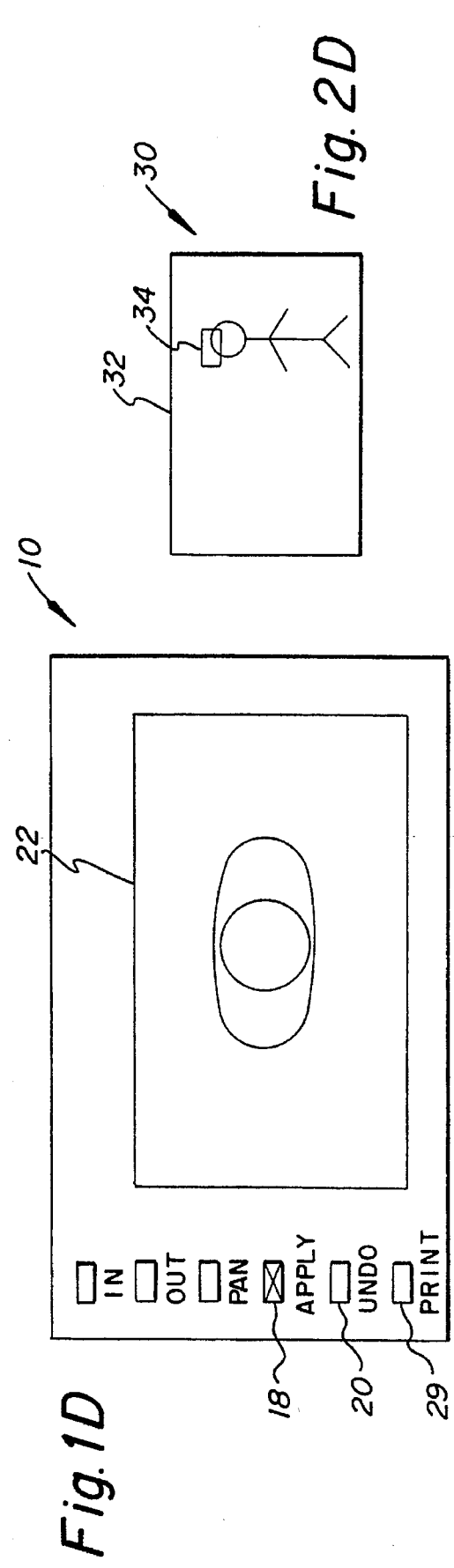

METHOD AND APPARATUS FOR APPLYING A FUNCTION TO A LOCALIZED AREA OF A DIGITAL IMAGE USING A WINDOW

This application is a continuation of application Ser. No. 08/278,790, filed Jul. 22, 1994, now abandoned.

BACKGROUND OF THE INVENTION

1. Field of the Invention

The present invention is directed to a system for applying a function to an area of a digital image where the area is selected by a user and, more particularly, to a method and apparatus that allows a user to control a window applied to a digital image and apply an artifact removal function to the portion of the image designated by the window, where the window can be moved around in the image by touching the display and the user can "zoom" on the portion of the image desired, thereby allowing the user to clearly identify the portion of the image to be processed.

2. Description of the Related Art

Amateur photographers, using simple and inexpensive cameras, often take photographs that the photographer wants to have reproduced to obtain additional copies or wants to have enlarged. The photographer will sometimes misplace the negatives and only retain the original print. In this situation the original print must be photographed or otherwise captured. This capturing can be done chemically or digitally. These photographs can include scratches, dust and other imperfections caused by handling as well as original image capture imperfections, such as the condition called "red-eye" where the eyes of subject appear to have a red spot in them. Such imperfections become particularly noticeable when the image is enlarged. These same problems occur when the original negative is retained by the photographer and is used for reproduction or enlargement.

To provide the amateur photographer with a higher quality reproduction, the local print shop operator needs to be able to easily and quickly identify a localized area of an image which has an artifact (red eye, dust, etc.) and then apply a correction only to the area specified by the operator. The restricted application of the correction function is necessary due to the nature of such image processing correction functions, such that the more aggressive the function is in detecting and removing artifacts, the more it is prone to false detections and failures (false corrections). A solution to this problem is to provide a user interface technique which allows an operator to precisely identify, and subsequently constrain the function to a localized area of a digital image.

Constraint techniques have been implemented on computers, through the use of graphical user interfaces, windowing systems and the use of pointing devices (computer mouse, pen etc.). Typically a point type location indicator is displayed on the computer screen (an arrow, cross hairs, etc.) which indicates to the operator where the application "thinks" the operator is pointing. From there the application can apply a function to a localized area. However, the application must also know the size of the area surrounding the location indicator (cross hairs). This is typically done by selecting a brush size and/or shape or drawing a border around the region of interest. Unfortunately, these widely used techniques all require fundamental knowledge of computer operation and application interface. Further, the user does not see the size of the area only the location indicator.

Professional Imaging Premier System and Consumer Imaging Create-It Software are two examples of Eastman Kodak Co. products which employ these techniques. The first system is intended for operators highly skilled in the art of digital imaging applications. The second system is a software package intended to be used by a skilled computer operator. Both systems do possess a user interface which attempts to simplify their operation. The user interface, however, assumes some level of computer application knowledge as previously discussed.

What is needed is a system that does not require any level of computer application knowledge.

SUMMARY OF THE INVENTION

It is an object of the present invention to provide an image processing system that allows a user to apply artifact removal functions to an image without requiring any knowledge of how computer applications operate.

It is another object of the present invention to provide a system that allows a user to identify a portion of an image to be processed by touching an image on a display.

It is also an object of the present invention to provide a system in which the region of an image visible to a user is the region to which an artifact processing function is applied.

It is an additional object of the present invention to provide a system in which what you see is what you process.

It is a further object of the present invention to provide a system that is low in cost.

It is still another object of the present invention to provide a system that can be operated by an untrained and unskilled operator, such as a consumer.

The above objects can be attained by a system that allows a user to scan in a photographic or negative image supplied by a photographer. The captured image is displayed on a touch sensitive display. The user can pan to and zoom on particular portions of the image to designate a region to be processed using a window. The window shows only what is contained within the window. The portion of the image which is seen by the user in the window is processed when the user indicates a function should be applied to the image. Once the processing is complete the corrected image can be printed or otherwise reproduced.

These together with other objects and advantages which will be subsequently apparent, reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIGS. 1A–1D illustrate operations on a sampled image as performed with window system of the present invention;

FIGS. 2A–2D illustrate the relationship of a source image 32 to a view port 34 and the window 22 of FIG. 1;

DESCRIPTION OF THE PREFERRED EMBODIMENTS

Figure 3:
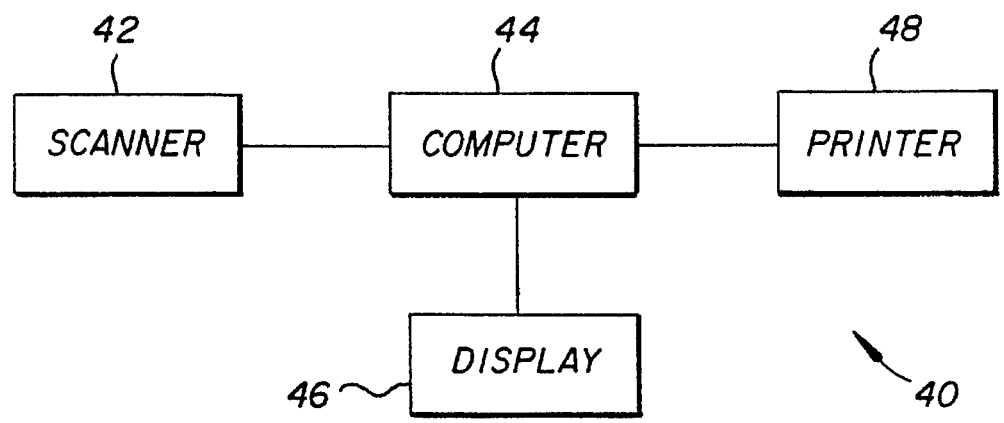
FIG. 3 depicts the hardware components of the present invention.

The present invention is preferably implemented as part of the user interface for the Digital Print System (DPS) implemented in the Imagic Magic Print System and Copy Print System products which are available from the Eastman Kodak Co. The DPS is a photographic reproduction device intended to be operated by unskilled retail clerks who have no computer or photofinishing training. The DPS performs many of the same digital image processing functions as computers running image processing applications; for example, an Apple Macintosh running Adobe Photo Shop. The DPS utilizes a cathode ray tube (CRT) display with a touch screen overlay as the user interface. The touch screen user interface provides a mechanism to display text and graphical icons to assist the operator.

The invention includes a technique by which a digital image is displayed on a CRT and the image is panned and zoomed, such that the portion of the image displayed (windowed).on the CRT can have a correction function applied to that localized area. The process which is manipulating the image during the display maintains "knowledge" of the area (window size and location) currently being displayed and provides this information to the process which actually performs the correction or artifact removal function.

The present invention, as the user interacts with the display to zoom and pan, presents a display image 10 to the user on the CRT as graphically illustrated by FIGS. 1A–1D. These figures represent a typical sequence of what the user will see during a typical interaction. Companion FIGS. 2A–2D depict how the invention manipulates a view port onto a source image and its relationship to a window in the display image 10 as the user interacts with the display.

The display image 10 (FIG. 1A) includes touch control "buttons" for zoom-in 12, zoom-out 14, pan 16, apply 18 and undo 20. These display operations and image processing functions are performed on the image displayed in a display window 22. In FIG. 1A the window 22 depicts a complete image of a photograph that has been digitally scanned and which includes a picture of a person as the subject 24. The user (not shown) typically wants to check the image for artifacts, such as dust and "red-eye". To do this the user needs to zoom-in and pan to the eyes of the subject 24 or to dust spots in the image. FIG. 1A illustrates that the user has already touched the zoom-in control 12 and has touched the image at a point 26 indicated by a "*". FIG. 2A illustrates the corresponding digital representation 30 of the source image in a computer connected to the CRT display providing the display image 10. When the image is first loaded into the computer from a scanner the source image 32 is the same size as the view port 34 and the display image 10 includes the entire source image 32 in the display window 22.

After the zoom-in and touch movement actions designated in FIG. 1A have been performed the display window 22, as illustrated in FIG. 1B, depicts an enlarged and shifted (panned) version of the original image. As illustrated, the point on the image designated by the touch point 26 in FIG. 1A has been moved to the center of the display window 22 and the image has been zoomed-in by a predetermined amount. That is, both a pan and a zoom operation have been performed on the source image 32. The view port 34, as illustrated in FIG. 2B, has been resized and shifted within the source image 32 to correspond to the zoom and pan operations designated by the user. As can bee seen by visually comparing the display window 22 of FIG. 1B with the memory representation of FIG. 2B, the view port 34 defines the portion of the source image 32 that is actually displayed in the display window 22. That is, only the portion of the source image 32 designated by the view port 34 is visible within window 22.

FIG. 1B also depicts that the user has selected pan 16 as the next operation to be performed and has touched the image at a touch point 27 corresponding to one of the eyes of the subject 24 of the photograph.

Once the pan operation designated in FIG. 1B 35 has been performed, the display image 10 and memory representation 30 change as illustrated in FIGS. 1C and 2C. As can be seen the view port 34 has stayed the same size relative to the source image 32 but has been moved so that the touch point 27 of FIG. 1B is in the center of the view port 34 and, as a consequence, is in the center of the window 22 of the display image 10.

FIG. 1C also illustrates that the user has selected zoom-in 12 as the next operation to be performed and has touch designated the same eye at the touch point 28. This will result in the view port 34 being resized without a shift in the center point of the view port 34 within the source image 32 as illustrated in FIGS. 1D and 2D.

As depicted in FIG. 1D one of the eyes of the subject 24 is now positioned in the center of the window 22 and the view port 32 is also centered on the eye as well as being of a size where only the area around the eye is defined as being within the view port 34. The user can now determine if the "red-eye" condition exists in the eye shown in the window 22. If the condition exists the user can activate a conventional process for correcting the artifact condition by touching the apply button 18. This will result in portion of the source image 32 seen by the user in the window 22 (as defined by the view port 34) being processed, that is, what you see is what is processed. If the results are not satisfactory the user can undo 20 the correction and return the image to it's original state.

Once this portion of the image is satisfactory the user can activate the "zoom-out" operation 14 and the pan 16 to make further corrections. Once all corrections have been made the user can touch the print "button" 24 (FIG. 1D) on the display image 10 and print the result for the photographer.

The use of the window 22 to indicate the region to be processed by the image processing function along with the resizing of the view port 34 during the zoom operation automatically indicates the size of the region to be processed. The window 22 along with the repositioning of the view port 34 during pan operation automatically indicates the center of the region to be processed. With this information the function to be applied can be applied to the correct area. Because of coupling of the window with the view port the user is allowed to use the processing system naturally relying on the visible contents of the window to define what will be processed.

The processes that are executed to perform the operations depicted by FIGS. 1A–2D are performed in a system 40 as illustrated in FIG. 3. The system 40 includes a scanner 42, such as the ES-800C available from Epson, and which provides the scanned image to a computer 44, such as a Sun Spark Workstation available from Sun Microsystems. The computer 44 displays the image on a touch sensitive screen and CRT display 46, such as the Touch Monitor model P274-UVGA available from Elographics. Once the image is processed according to the directions of the user, the computer 44 provides the image to a printer, such as the MAC AV840 available from Apple. Although the components 42, 44, 46 and 48 have been shown as separate components the system can be configured to use the computer found in a printer, such as occurs when the preferred implementation using the Kodak printer is implemented. That is, the components 42, 44, 46 and 48 can be grouped arbitrarily as desired by the user.

The present invention includes three general steps. The first is to subsample the captured image to derive a suitable subset of image data to represent the entire original image in the display window 22. This is because the original source image is not scanned at the resolution of the CRT display. As a result, it must be subsampled at a frequency that will allow the entire subsampled image to "fit" in the CRT display area; for example, a 300 sample per inch (spi) source image scan of a 4 inch by 6 inch original photograph will result in a digital image of 1,200 by 1,800 samples. If the CRT is a VGA style display producing a 600 by 800 pixels display with only 400 by 600 pixels set aside for the window 22, the source data must be subsampled at a frequency of 3:1 with three source pixels to each display pixel in each dimension (horizontal and vertical). Because the relative size of the view port 34 on the original source image 32 and the number of pixels in the window 22 may not result in an integer sampling frequency a sampling strategy appropriate to the noninteger ratio needs to be used. Additionally, if the zoom-in results in the view port 34 including less pixels than the window 22 the source image 32 must be supersampled. Any of a number of conventional strategies for subsampling and supersampling can be used, such as nearest neighbor subsampling and with replication of the sampled pixel for supersampling.

The second step is to subsample the original source image data and display it as designated by the operator or user as indicated by the operation selected and the touch point indicated. The subsampling frequency changes depending on the zoom operation designated and the resulting resizing and movement of the view port 34. For a zoom-out operation the subsampling frequency increases and for a zoom-in operation the subsampling frequency decreases. For example, if a zoom-in of 15% from the example previously discussed occurs the subsampling frequency would change from 3:1 to 3:2 resulting in three source pixels to each two display pixels. The second step is repeated until the operator has identified the region of interest in the source image.

The third step is to apply the selected image processing function to the region of the original source image data based on the current region of the image being displayed in the window 22 and designated by the view port 34.

Figure 5A:
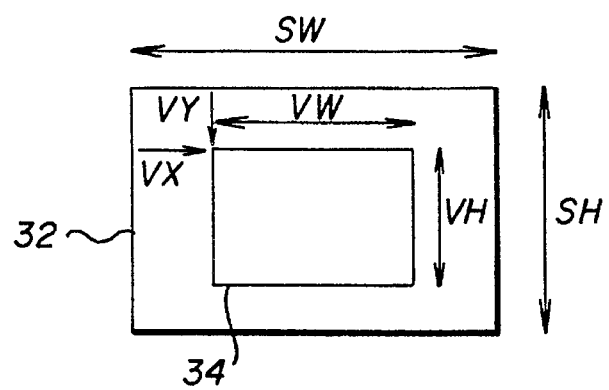
FIG. 5 illustrates the pointers and parameters of the source image 32, the view port 34 and the window 22.
Figure 5B:
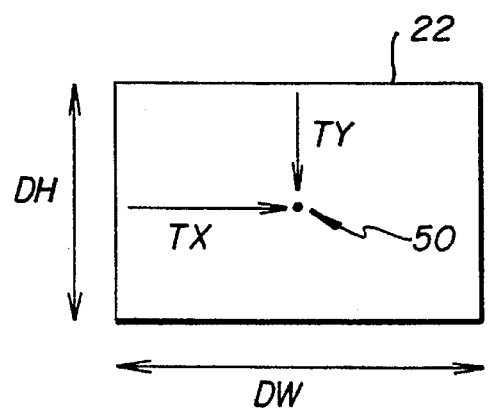
Figure 4:
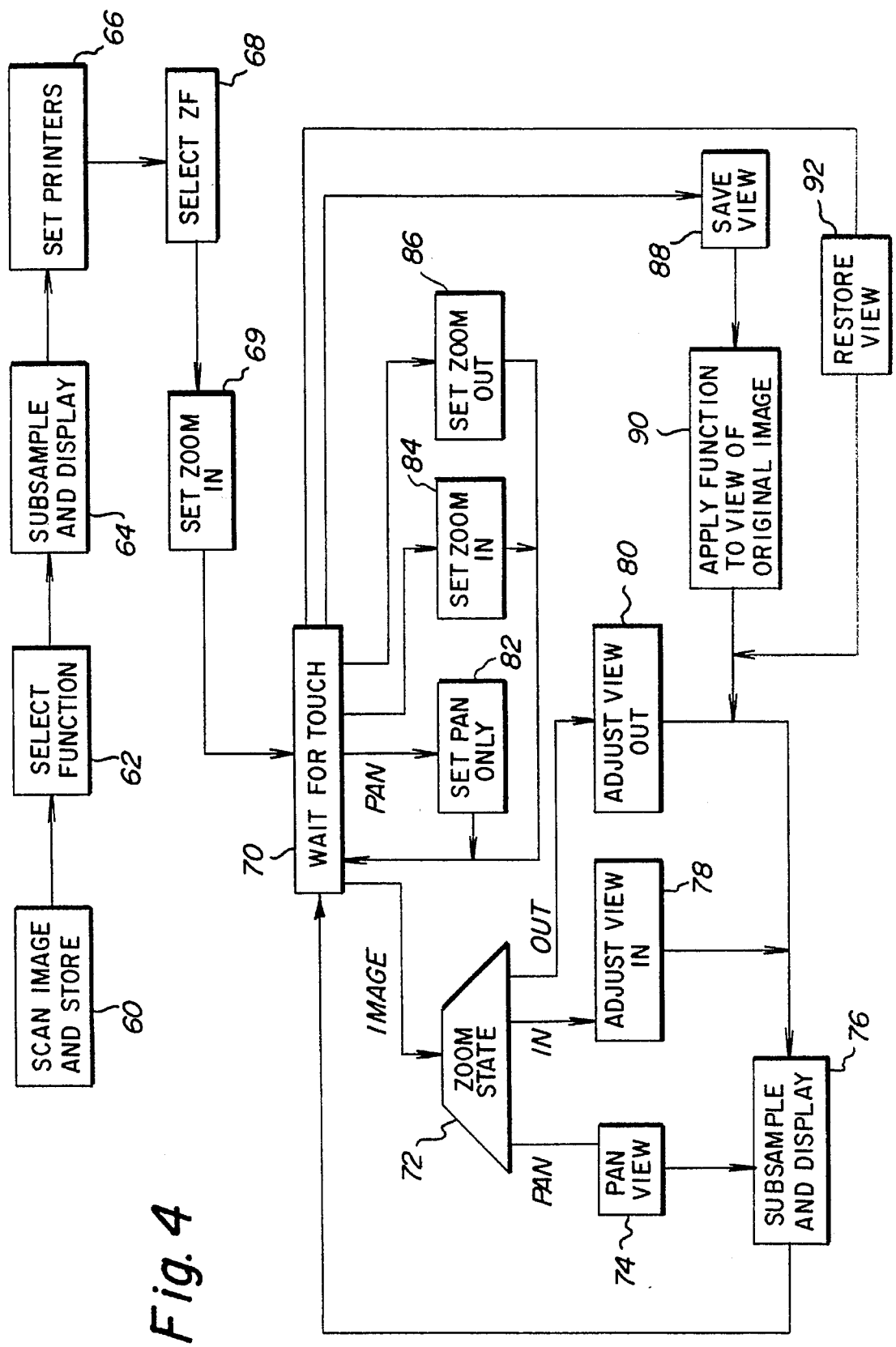
FIG. 4 is a flowchart of the operations according to the present invention.

FIG. 4 illustrates the details of the process of the present invention described above in greater detail. Once the user has loaded the picture to be scanned into the scanner the image is scanned and stored 60. At this point the user is allowed to designate 62 a conventional image processing function or algorithm to be applied to the portion of the source image designate by the view port 34. As noted previously this could be conventional "red-eye", dust, crease, scratch, etc. removal. The system then subsamples the source image 32 at an appropriate frequency and displays the image in the window 22. The image processing pointers and parameters for the view port 34 source image 32 and touchpoint 50 (see FIG. 5) are then set 66 where the view port width VW is set as the source image width SW, the view port height VH is set as the source image height SH, the view port upper left X and Y coordinates VX and VY are set as the upper left X and Y coordinates of the source image 32, the touch point location TX and TY is set at the center of the display window 22 (and the view port 34) and the width DW and height DH of the display window 22 are set where this is 600 by 400 in the above example of a VGA display. The user is then allowed to set 68 the zoom factor ZF, which preferably defaults to a value such as 25%. The system then sets 69 a zoom state to zoom-in. Once the processing set-up has been performed the system essentially enters a wait state 70 waiting for the user to touch the touch screen of the display 46.

If the image is touched the system determines 72 the zoom state. If the zoom state is "pan" the system performs a pan adjustment in accordance with:

$$VX'=(TX/DW)*VW+VX-(VW/2) \quad (1)$$

$$VY'=(TY/DH)*VH+VY-(VH/2) \quad (2)$$

where VX' and VY' are the new upper left coordinates of the view port 34 and replace VX and VY in the next cycle. During the pan operation calculation, edges of the view port 34 on the source image 32 as determined by VX, VY, VW and VH are compared to the coordinates for the edges of the source image 32 and, if the pan movement would move an edge of the view port 34 past the edge of the source image 32, the coordinates VX and VY are adjusted to place the view port 34 edge on the edge of the source image 32. That is, the view port 34 is not allowed to move off of the source image 32, so that the source image 32 seen through the window 22 will always fill the window 22. This maintains the "what you see is what is processed" objective. The source image is subsampled and the subsampled image is displayed 76 in the window 22. The subsampling starting point in the source image 32 is determined by VX' and VY' and the frequency is governed by the relative size of the view port 34 compared to the window 22. In a pan only operation the subsampling frequency remains the same as in the previous cycle.

If the zoom state is "in" the view port 34 is adjusted 78 in accordance with:

$$VW'=VW*ZF \quad (3)$$

$$VH'=VH*ZF \quad (4)$$

where VW' and VH' are new view port width and height. During this adjustment the coordinates of the upper left of the view port 34 are also computed in accordance with (1) and (2) using the new view port width and height determined by (3) and (4). If the zoom state is "out" the view port 34 is adjusted 80 in accordance with:

$$VW'=VW*(1/ZF) \quad (5)$$

$$VH'=VH*(1/ZF) \quad (6)$$

where once again the width view port size adjustment is associated with an adjustment of the start point coordinates using (1) and (2). At the end of the steps 74, 78 or 80 the offset and size of the view port 34 on the original source image are stored, that is, the upper left coordinates VX and VY and the view port size parameters VW and VH are stored, for later modification in a subsequent movement cycle or if the operator touches the apply button 18 and these parameters need to be transferred to the artifact processing algorithm. After the view port size and position adjustment the system subsamples the source image 32 at an appropriate frequency and displays 76 the subsampled image in the window 22 as previously discussed.

If the user has touched the pan 16, in 12 or out 14 "buttons" on the display 10 the system sets 82,84 or 86 the appropriate parameter and returns to the wait state. If the user touches a zoom factor adjustment button (not shown) the system allows the user to select a different zoom factor.

If the user selects the apply function ("button" 18) the system saves 88 the contents of the source image 32 designated by the view port 34 and applies the selected function to the portion of the source image 32 designated by the view port 34 using the upper left coordinates VX and VY of the view port 34 and the view port width VW and height VH as the control parameters for the artifact removal algorithm. The processed image is then subsampled and displayed 76 for review by the user. The operator can then zoom-out, in or pan, as desired, to see the effect of the artifact removal with reference to other portions or the entire original image. If the user is dissatisfied with the results the user can select the undo function and the saved contents of the source image mentioned above are restored to the source image 32 and the image is again subsampled and displayed 76.

When the user selects the print operation ("button" 24) the system produces a preview of the entire image and, if the image is acceptable, the image is printed.

The user at the preview stage can be allowed to specify a particular output image format, such as 8 inch by 10 inch or 3 inch by 5 inch, and the system will allow the operator to crop the image as desired to fit the output format. This can be done by changing the aspect ratio of the window 22 and view port 34 to agree with the aspect ratio of the selected format and then allowing the operator to pan and zoom as previously described until the desired cropped image is displayed in the window 22, so that "what you see is what you get". The portion of the image defined by the view port 34 during the cropping of the image is subsampled at an appropriate frequency as governed by the resolution of the source image 32 and the resolution of the printer being used for printing.

The many features and advantages of the invention are apparent from the detailed specification and thus it is intended by the appended claims to cover all such features and advantages of the invention which fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

Reference Number List

10 Display image
12 Zoom-in screen button
14 Zoom-out screen button
16 Pan screen button
18 Apply screen button
20 Undo screen button
22 Display window
24 Subject
26–28 Touch points
29 Print screen button
30 Source image digital representation
32 Source image
34 View port
40 System
42 Scanner
44 Computer
46 Display
48 Printer
60–92 Flowchart steps

What is claimed is:

1. A method of applying an artifact removal function to a source image, comprising:
   a. scanning a photograph to capture the source image thereon at a first resolution;
   b. subsampling the captured source image based on a variable size view port positioned on the source image to produce a first subsampled image at a second lower resolution and displaying the first subsampled image as defined by the view port with the subsampled image filling a fixed size display window on and smaller than a touch screen display;
   c. allowing an operator to touch the window to indicate a location of an artifact in the image;
   d. automatically adjusting a size of the view port by a predetermined amount and adjusting a position of the view port responsive to the touch indication;
   e. sampling the image within the adjusted size and position view port to produce a second subsampled image and displaying the second subsampled image filling the window;
   f. repeatedly performing steps c–e as initiated by the operator;
   g. allowing the operator to touch an area adjacent to the window to indicate the subsampled image is ready to have the correcting function applied;
   h. determining coordinates of the window within the source image;
   i. detecting the artifact within the source image in a region defined by the coordinates and automatically applying the artifact removal function to remove the artifact in the image and only to a portion of the source image designated by the coordinates;
   j. allowing the operator to initiate performance of steps a–e to view an effect of the function relative to the image; and
   k. printing the image.

2. A method as recited in claim 1, wherein when one of a zoom-in operation and a zoom-out operation is indicated b., a size of the view port on the image is adjusted responsive to different predetermined in and out zoom amounts in step c.

3. A method as recited in claim 1, wherein step b. comprises subsampling the image responsive to relative sizes of the window and the view port.

4. A method as recited in claim 1, where the window is smaller than the display.

* * * * *